United States Patent

Feldmanis

[15] 3,651,865

[45] Mar. 28, 1972

[54] COOLED ELECTRONIC EQUIPMENT MOUNTING PLATE

[72] Inventor: Carl J. Feldmanis, New Carlisle, Ohio

[73] Assignee: The United States of America as represented by the Secretary of the Air Force

[22] Filed: Aug. 21, 1970

[21] Appl. No.: 65,827

[52] U.S. Cl. ................................165/80, 165/104, 165/105, 317/100, 317/234 B

[51] Int. Cl. ..........................................................H01l 1/12

[58] Field of Search ....................165/80, 104, 105; 317/100, 317/234 A, 234 B; 174/15 R, 16

[56] References Cited

UNITED STATES PATENTS

| | | | |
|---|---|---|---|
| 3,226,602 | 12/1965 | Elfving | 174/16 X |
| 3,489,203 | 1/1970 | Fischell | 165/105 X |
| 3,141,998 | 7/1964 | Silkman | 317/100 |
| 3,563,309 | 2/1971 | Basiulis | 165/105 |
| 3,143,592 | 8/1964 | August | 165/105 X |
| 3,209,062 | 9/1965 | Scholz | 165/105 X |
| 3,328,642 | 6/1967 | Haumesser et al | 317/100 |

FOREIGN PATENTS OR APPLICATIONS

| | | | |
|---|---|---|---|
| 791,491 | 3/1958 | Great Britain | 317/234 B |

*Primary Examiner*—Albert W. Davis, Jr.
*Attorney*—Harry A. Herbert, Jr. and Richard J. Killoren

[57] ABSTRACT

An electronic equipment mounting plate has capillary type heat pipes secured thereto. A condenser section is provided near the center of the plate with a coolant being passed through cooling tubes positioned adjacent the central portion of the heat pipes to provide a heat sink. In one embodiment temperature control is provided by means of a noncondensable gas and a closed end tube within the heat pipe passages adjacent the heat sink.

3 Claims, 9 Drawing Figures

INVENTOR.
CARL J. FELDMANIS
BY Harry A. Herbert, Jr.
and ATTORNEY
Richard J. Killoren
AGENT INVENTOR.
CARL J. FELDMANIS
BY Harry A. Herbert, Jr.
and ATTORNEY
Richard J. Killoren
AGENT INVENTOR.
CARL J. FELDMANIS
BY Harry A. Herbert, Jr.
and ATTORNEY
Richard J. Killoren
AGENT

COOLED ELECTRONIC EQUIPMENT MOUNTING PLATE

BACKGROUND OF THE INVENTION

With increased power dissipation requirements of microminiaturized and solid state circuitry, more thermally stable mounting plates for such devices are required. While heat pipes have been used to transport heat from the electronic equipment compartment to radiator elements removed from the compartment, with increased power dissipation requirements, more direct cooling of the electronic equipment is needed. Vapor-phase cooling of electronic components has been accomplished as described in the U.S. Pat. No. to Plevyak, No. 3,476,175. However in such systems the components are surrounded with liquid which greatly increases the sealing problem. In such apparatus the equipment would be subject to great heat damage, if the liquid is lost due to a leak in the system, or if the cooling system is tilted.

BRIEF SUMMARY OF THE INVENTION

According to this invention use is made of capillary type heat pipes to provide cooling for the mounting plate for the electronic components. The capillary heat pipe mechanism is described with respect to FIG. 21 in column 8 of the patent to Vary, U.S. Pat. No. 3,490,718. With the use of heat pipes the sealing problem is simplified. Also the use of capillary type heat pipes reduces orientation and wight problems where such equipment is used in outer space. Furthermore, an auxiliary cooling systems can be used with the heat pipe system which provides greater protection for the equipment. A temperature control arrangement is also provided in one embodiment of the invention.

IN THE DRAWING

DETAILED DESCRIPTION OF THE INVENTION

Figure 1:
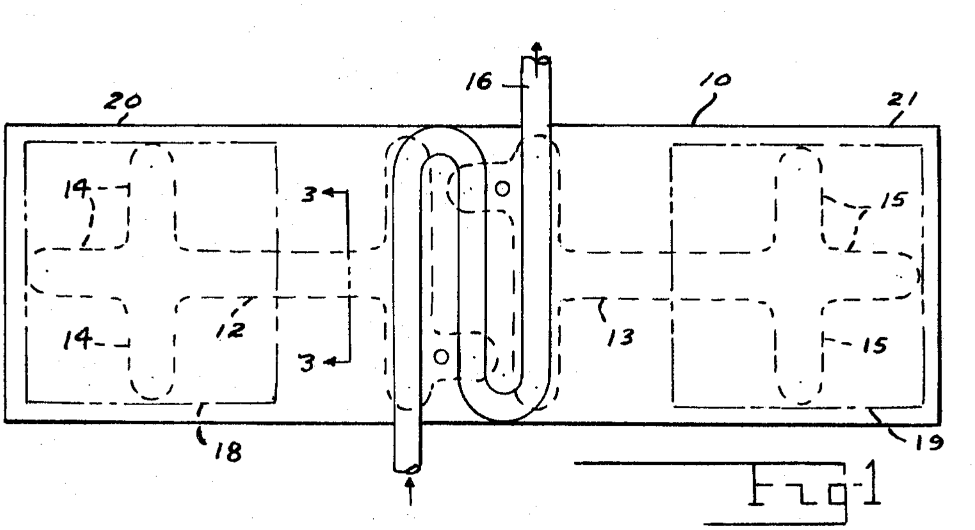
FIG. 1 is a plan view of an experimental cold plate to illustrate the performance of the invention.
Figure 2:
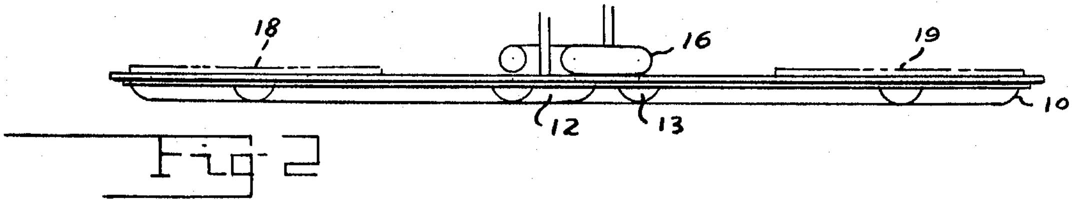
FIG. 2 is a side view of the device of FIG. 1.
Figure 4:
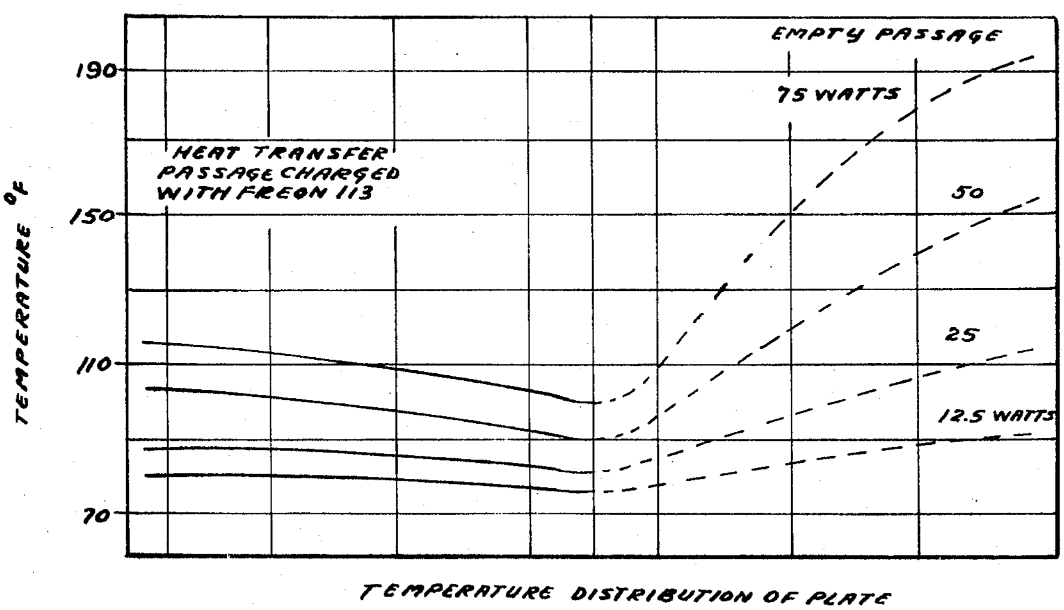
FIG. 4 shows a temperature distribution chart for the test plate of FIG. 1 with fluid in the passages on one side of the plate.
Figure 3:
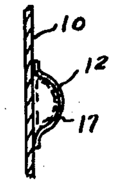
FIG. 3 is a sectional view along the line 3—3 of FIG. 1.

With reference to FIGS. 1 and 2 of the drawing, an experimental cold plate 10 was constructed to test the application of the heat pipe principle to mounting plates for electronic equipment. The cold plate has a pair of heat pipe passages 12 and 13 with legs 14 and 15 extending to different areas of the plate 10. A wick 17, consisting of one or more layers of copper screen, is positioned in the passages 12 and 13 as shown in FIG. 3. A heat sink is formed by a tube 16 attached to the opposite surface of plate 10. A cooling fluid such as water is circulated in tube 16. Electrical heaters 18 and 19 are positioned over portions of the ends 20 and 21 of plate 10. A coolant such as trichlorotrifluorethane (Freon 113) was supplied to the heat pipe passages 12 with passage 13 left empty. The heat distribution for the plate 10 with different power levels for heaters 18 and 19 is shown in FIG. 4.

Figure 5:
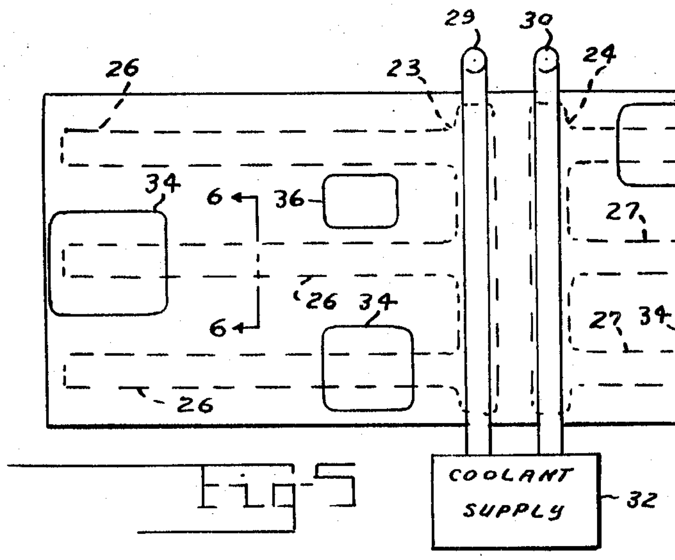
FIG. 5 is a plan view of an electronic component mounting plate according to one embodiment of the invention.
Figure 6:
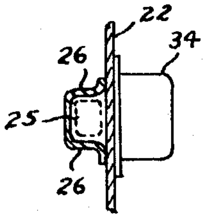
FIG. 6 is a sectional view of the device of FIG. 5 along the line 6—6.

In the device of FIG. 5 the heat pipe principle is adapted for use with electronic circuitry. An electronic element mounting plate 22, made of a thermally conductive material such as copper or aluminum, has a pair of heat pipes 23 and 24 secured to the bottom thereof, by any well known means such as welding. The heat pipes 23 and 24 have a plurality of legs 26 and 27 respectively. The heat pipes have wicks 25 therein, as shown in FIG. 6. These may be copper screen wicks or other well known heat pipe wick structure. Colling tubes 29 and 30 are secured to the opposite side of plate 22 by welding or other well known means and are positioned adjacent the central portion of heat pipes 23 and 24, to provide a heat sink. A cooling fluid, such as water, is supplied to tubes 29 and 30 from supply 32. Electronic components, shown schematically at 34 may be positioned over heat pipe legs 26 and 27. Elements such as shown schematically at 36 that cannot be positioned over the heat pipe legs due to mounting problems may be positioned between heat pipe legs 26 and between the heat pipe legs 27. Heat produced by the elements 34 and 36 is transferred to the heat sink according to the conventional capillary heat pipe mechanism.

Figure 7:
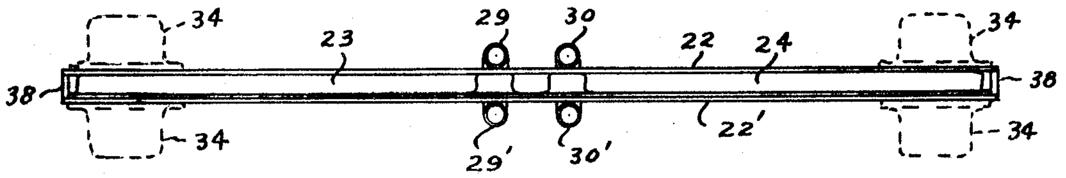
FIG. 7 shows a side view of another embodiment of the invention.
Figure 8:
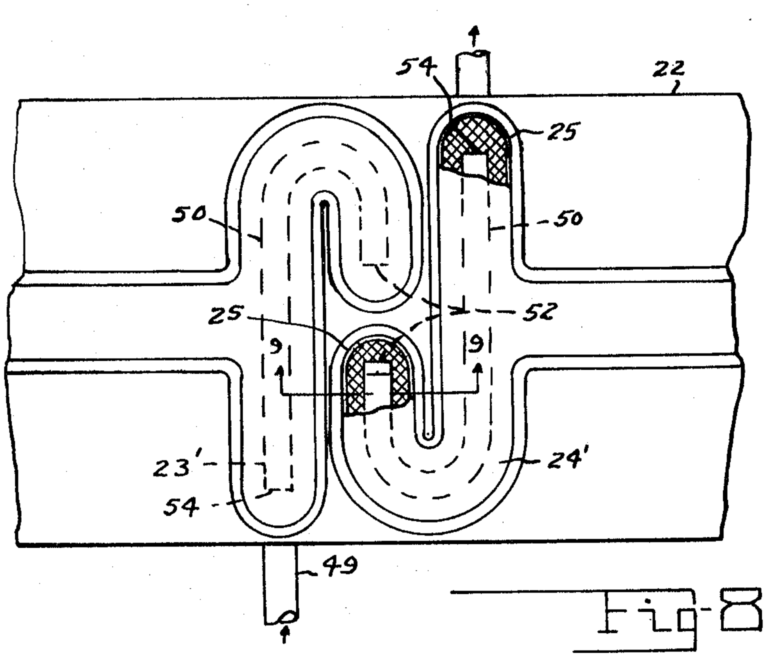
FIG. 8 is a plan view of a further embodiment of the invention.
Figure 9:
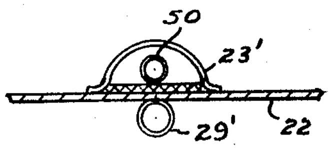
FIG. 9 is a sectional view of the device of FIG. 8 along the line 9—9.

As shown in FIG. 7, a second mounting plate 22′ may be positioned on the opposite side of heat pipes 23 and 24 from plate 22 so that additional elements 34 and 36 may be mounted thereon. Also additional cooling tubes 29′ and 30′ may be secured to plate 22′. If the space between the plates 22 and 22′ is sealed, as shown at 38, cooling mediums may be provided between the heat pipes to provide added protection for the equipment. The additional coolant could be a heat of fusion type material, such as bees wax or a vaporization type, such as Freon 113, FC-25 or FC-75. Also with this space sealed the additional coolant could be stored in separate storage containers to be supplied to the space in mounting plate when needed in the event cooling from the heat pipes is lost. It is sometimes desirable to provide some temperature control to the mounting plate to compensate for heat load changes. Such control is provided with the device shown in FIGS. 8 and 9. In this device an inert gas, such as argon or nitrogen, that is noncondensable at the temperature of the coolant in the heat sink is provided within the heat pipe passages 23′ and 24′. A pair of tubes 50 open at ends 52 and closed at ends 54 are positioned within the heat pipe passages 23′ and 24′, as shown in FIG. 9. The vaporized heat transfer liquid moving toward the heat sink forces some of the noncondensable gas into the tubes 50. At higher heat levels the flow of vaporized gas toward the heat sink is increased so that more noncondensable gas is forced into tubes 50. This uncovers greater portions of the wick 25 adjacent the heat sink 49 and increases the rate of condensation to provide increased cooling.

While tubes 50 have been shown as wholly contained within the passages 23′ and 24′, the closed end could extend outside the passages.

There is thus provided a cooling system for electronic equipment that reduces sealing, orientation and weight problems of prior art cooling systems.

I claim:

1. An electronic equipment mounting plate comprising: a sheet of thermally conductive material having a plurality of electronic components mounted thereon; means for forming a heat sink on said mounting plate; means secured to said mounting plate for forming a plurality of heat pipe passages extending between the position of electronic components and said heat sink; a heat transfer fluid within said passages; means for providing a capillary pumping action for moving liquid from the heat sink to a position adjacent the electronic components; a second sheet of thermally conductive material having a plurality of electronic components mounted thereon; said second sheet being positioned adjacent said heat pipe passages; means attached to said second sheet for forming a second heat sink on the opposite side of the mounting plate near said first heat sink and means for sealing the space between the thermally conductive sheets surrounding the heat pipes and additional means, in said space between the heat conductive sheets surrounding the heat pipes, for providing cooling for the electronic components.

2. The device as recited in claim 1 wherein the cooling means in the space surrounding the heat pipes is a heat of fusion type material.

3. The device as recited in claim 1 wherein the cooling means in the space surrounding the heat pipes is a vaporization type coolant.

* * * * *